United States Patent
Chiang et al.

(10) Patent No.: US 7,020,834 B2
(45) Date of Patent: Mar. 28, 2006

(54) CIRCUIT AND SIGNAL ENCODING METHOD FOR REDUCING THE NUMBER OF SERIAL ATA EXTERNAL PHY SIGNALS

(75) Inventors: Chin-Yi Chiang, Taipei (TW); Tse-Hsien Wang, Bade (TW)

(73) Assignee: Via Technologies, Inc., Taipei (TW)

( * ) Notice: Subject to any disclaimer, the term of this patent is extended or adjusted under 35 U.S.C. 154(b) by 342 days.

(21) Appl. No.: 10/247,475

(22) Filed: Sep. 20, 2002

(65) Prior Publication Data

US 2003/0081743 A1    May 1, 2003

Related U.S. Application Data

(60) Provisional application No. 60/329,711, filed on Oct. 18, 2001.

(30) Foreign Application Priority Data

Apr. 2, 2002    (TW) ............................... 91106557 A

(51) Int. Cl.
*H04L 1/00*    (2006.01)
*G12B 5/00*    (2006.01)
*G11B 5/00*    (2006.01)

(52) U.S. Cl. ..................... 714/799; 714/700; 714/48; 360/32

(58) Field of Classification Search ................ 714/752, 714/758, 799, 700, 48; 360/32
See application file for complete search history.

(56) References Cited

U.S. PATENT DOCUMENTS 5,299,193 A * 3/1994 Szczepanek ................ 370/463
5,953,386 A * 9/1999 Anderson .................... 375/376
6,397,042 B1 * 5/2002 Prentice et al. .......... 455/67.14
6,650,141 B1 * 11/2003 Agrawal et al. .............. 326/41
6,662,332 B1 * 12/2003 Kimmitt ..................... 714/762

* cited by examiner

*Primary Examiner*—Guy Lamarre
*Assistant Examiner*—Esaw Abraham
(74) *Attorney, Agent, or Firm*—Rosenberg, Klein & Lee

(57) ABSTRACT

A Circuit for reducing the number of serial ATA external PHY signals includes: a serializer/deserializer, connected to a storage medium controller through a set of parallel signal transmitting lines and a set of parallel signal receiving lines, so as to convert signals between parallel and serial specifications; a phase locked loop, connected to the serializer/deserializer so as to generate a clock signal required for data signal transmission; at least one pair of transmitter and receiver, each connected to the serializer/deserializer, each transmitter able to transmit the serial data signal from the serializer through a set of serial signal transmitting lines to a serial ATA device, and each receiver able to receive the serial data from the serial ATA device through a set of serial signal receiving lines to the deserializer; and at least one OOB signal detector, each connected to the corresponding receiving lines, so as to detect the out of band signals from the serial ATA device. The Circuit also employs in certain applications a signal encoding approach for reducing the number of serial ATA external PHY signals, wherein an encoder and a decoder are employed to encode control signals and status signals into special data codes transmitted between a serial ATA external PHY and a storage medium controller, so as to minimize the number of interface signals.

15 Claims, 4 Drawing Sheets

(PRIOR ATR)

CIRCUIT AND SIGNAL ENCODING METHOD FOR REDUCING THE NUMBER OF SERIAL ATA EXTERNAL PHY SIGNALS

REFERENCE TO RELATED APPLICATIONS

This patent application is based upon Provisional Patent Application Ser. No. 60/329,711, filed at the U.S. Patent and Trademark Office on 18 Oct. 2001.

BACKGROUND OF THE INVENTION

1. Field of the Invention

The present invention generally relates to an ATA (advanced technology attachment) interfaced Circuit and a signal encoding method and, more particularly, to a Circuit and a corresponding method for reducing the number of serial ATA external PHY (physical layer) signals. The Circuit employs a configuration in which digital means and analog means are separated so as to install the high-frequency analog circuit portion into an external PHY chip. The behavior of the PHY signals and the characteristic of 10-bit data encoding are also utilized to encode the control signals as well as the status signals into the multi-level interface signals or into a special 10-bit data encoding on the data bus so as to significantly reduce the number of required PHY signals.

2. Description of the Prior Art

In recent years, with the high development in information-related industries, people have increasing needs for a higher operation speed as well as a higher data transmission rate in the computer system. In view of this, the industries have made lots of efforts to improve the data transmission rate on the data storage system. For example, the earliest ATA interface proving a data transmission rate of 16 MBps (mega bytes per second) has been replaced by the follow-ups such as the ATA33 interface proving a data transmission rate of 33 MBps, the ATA66 interface proving a data transmission rate of 66 MBps and the modern-day ATA100, ATA133, etc. With a parallel data transmission scheme, however, the fore-mentioned ATA interface specifications have suffered from a need for more signal lines as well as an interfering noise, leading to severer limit for signal line length as well as improvement in data transmission rate.

More recently, a novel serial ATA interface has been presented to the public, in which the data transmission rate increases to 1.5 Gbps (giga bit per second) for the first generation serial ATA interface and is expected to be 3.0 Gbps for the second generation serial ATA interface and even 6.0 Gbps for the third generation serial ATA interface. Moreover, there are only four signal lines required for data transmission and the allowed signal line length can be prolonged.

However, as the serial ATA interfaced products are still under intensive development, parallel ATA interfaced products dominate the market. In order to look after both sides, the manufacturers of computer products would rather choose to support both the parallel ATA interface and the serial ATA interface.

To operate in coordination with the upgraded transmission rate of the data storage system as well as the compatibility between the product specifications, some manufacturers have proposed various solutions. Please refer to, for example, FIG. 1, which is a block diagram schematically illustrating the configuration of a conventional ATA interface configuration. In FIG. 1, a storage medium controller 121 in a host controller chip 12 (for example, a south bridge chip) comprises a serial ATA PHY 123, through which the storage medium controller 121 is connected to a serial ATA device 16 (for example, a serial ATA hard disk). The storage medium controller 121 is also connected to a parallel ATA device 18 (for example, a parallel ATA hard disk) through an IDE bus 14. In this configuration, both the parallel ATA interfaced device and the serial ATA interfaced device can be supported; however, the serial ATA PHY 123 typically occupies a larger area due to its high-frequency analog applications. Therefore, host controller chip 12 containing the serial ATA PHY 123 has to have a large area high speed analog function with it, which leads to poor fabrication yield as well as high fabrication cost.

In view of this, there is need in providing a new solution to the problems related to the conventional circuit configuration. A simple but effective Circuit is disclosed in the present invention to minimize the number of interface signals, lower the fabrication cost and improve the yield.

SUMMARY OF THE INVENTION

Accordingly, it is the primary object of the present invention to provide a Circuit and a signal encoding method for reducing the number of serial ATA external PHY signals, in which a host controller chip contains most of the digital circuit and an analog major circuit that are designed separately. In the Circuit, the high-frequency analog circuit portion is fabricated in an external PHY chip and the digital control circuit is setup in a storage medium controller, and the number of serial ATA external PHY signals is significantly reduced by adequate signals encoding.

It is a secondary object of the present invention to provide a Circuit for reducing the number of serial ATA external PHY signals, in which a host controller chip transmits a control signal to a PHY chip by using a multi-level signal and the PHY chip transmits a status signal to the host controller chip by using a multi-level signal.

It is another object of the present invention to provide a Circuit for reducing the number of serial ATA external PHY signals, in which a signal encoder and a signal decoder are utilized to encode some control signals and status signals into data signals so as to significantly reduce the number of required interface signals.

It is still another object of the present invention to provide a signal encoding method for reducing the number of serial ATA external PHY signals, in which the characteristics of signal encoding are utilized to replace an original 10-bit data code by an unusually encoded 10-bit signal code for the sake of identification.

In order to achieve the foregoing objects, the present invention provides a Circuit for reducing the number of serial ATA external PHY signals, comprising: a serializer/deserializer (SerDes), connected to a storage medium controller through a set of parallel signal transmitting lines and a set of parallel signal receiving lines, so as to convert a parallel signal from the storage medium controller into a serial data and to convert a serial data from serial ATA devices into a parallel signal and transmit these signals to the storage medium controller; a phase locked loop, connected to the serializer/deserializer so as to generate clock signals required for serial data transmission and a reference clock signal to the storage medium controller; at least one pair of transmitter and receiver, each connected to the serializer/deserializer, each transmitter able to transmit the serial data from serializer through a set of serial signal transmitting lines to a serial ATA device, and each receiver able to receive the serial data from the serial ATA device through a set of serial signal receiving lines to the deserializer; and at least one OOB (out-of-band) signal detector, each connected to the corresponding receiving lines, so as to detect the out of band signals from the serial ATA device to the storage medium controller.

The present invention further provides a signal encoding method for reducing the number of serial ATA external PHY signals, wherein an encoder and a decoder are employed to encode control signals and status signals into special data codes transmitted between a serial ATA external PHY and a storage medium controller, so as to minimize the number of interface signals.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE INVENTION

The present invention providing a Circuit and a signal encoding method for reducing the number of serial ATA external PHY signals can be exemplified by the preferred embodiments as described hereinafter.

Figure 1:
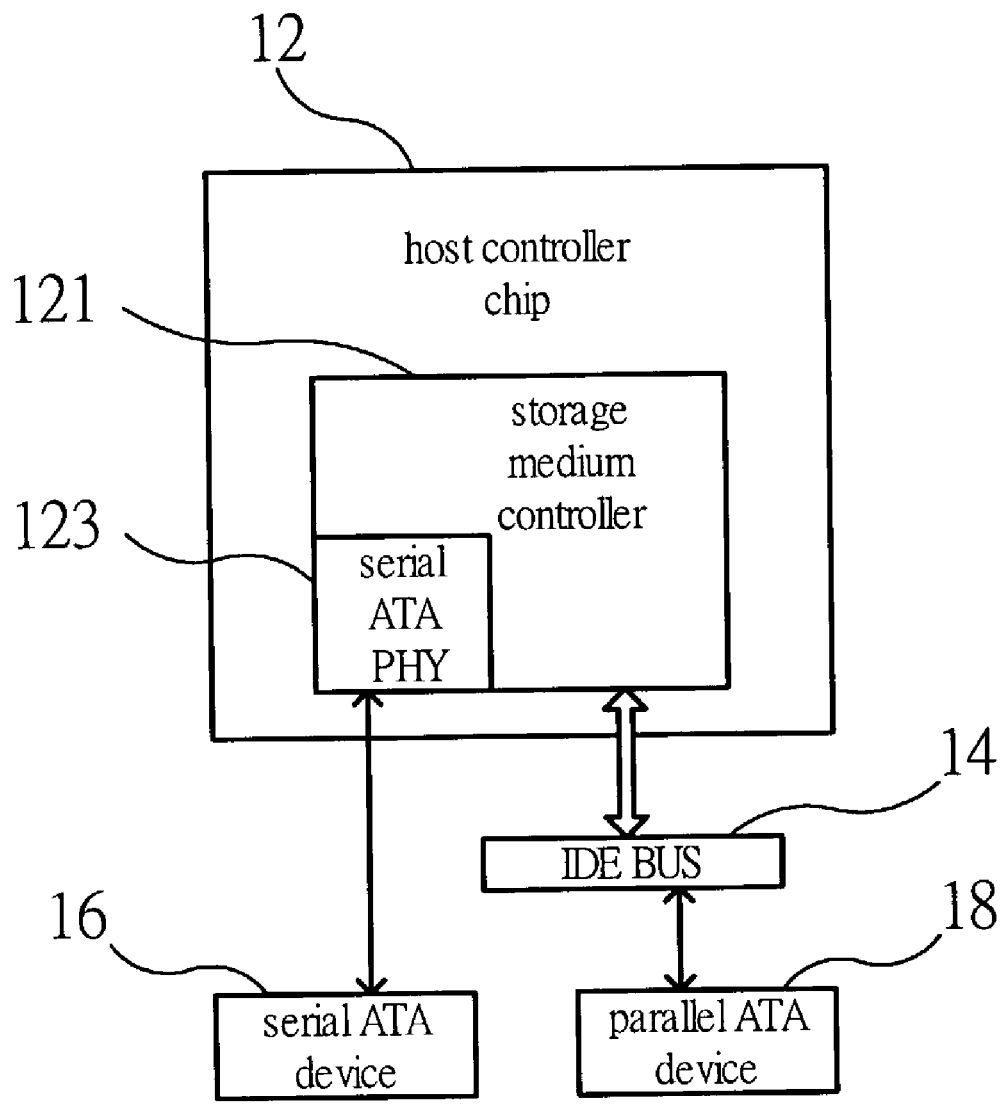
FIG. 1 is a block diagram schematically illustrating the configuration of a conventional ATA interface configuration in accordance with the prior art.
Figure 2:
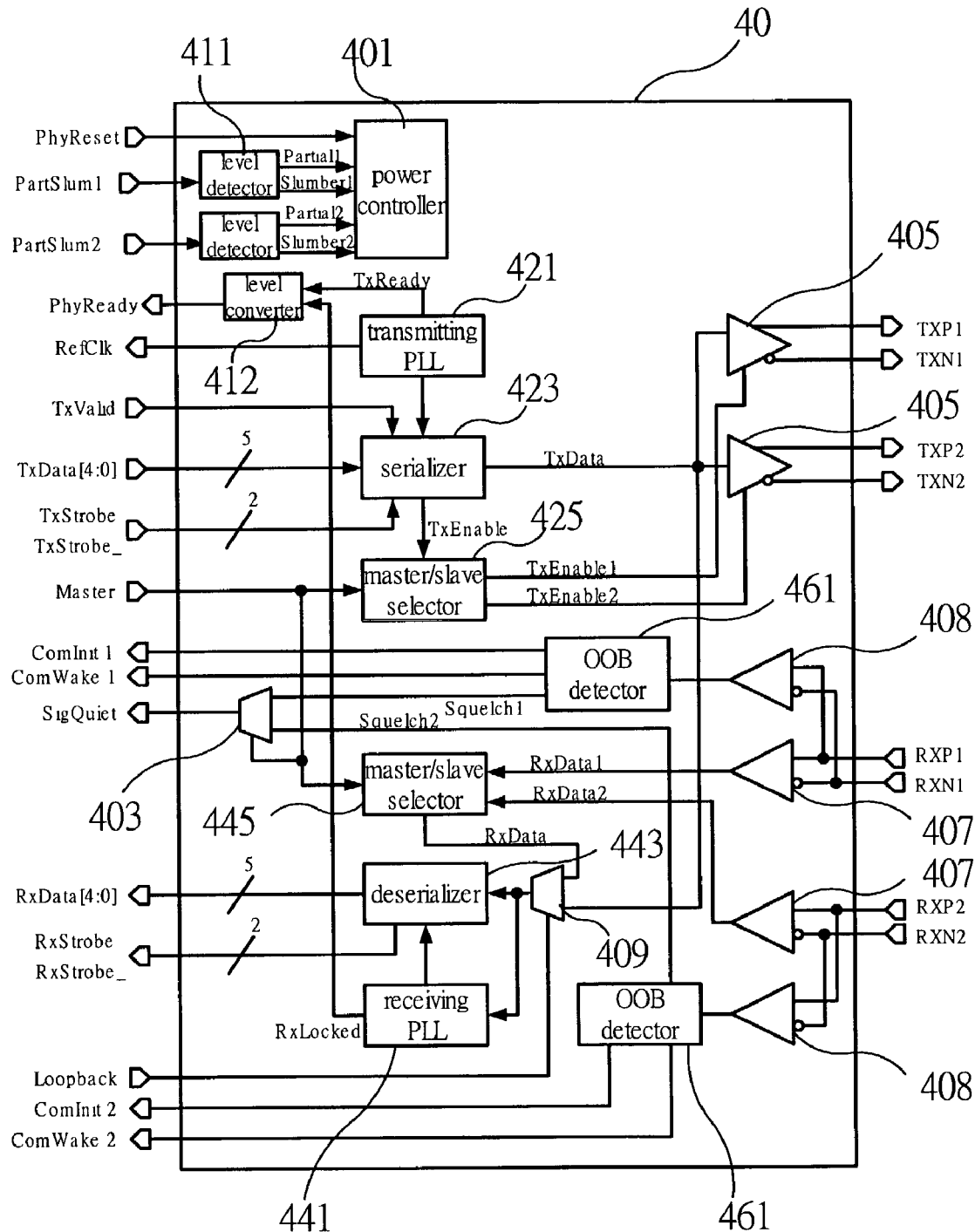
FIG. 2 is a circuit diagram in accordance with one preferred embodiment of the present invention.

To start with, please refer to FIG. 2, which is a circuit diagram of a serial ATA external PHY chip in accordance with one preferred embodiment of the present invention. As shown in the figure, the circuit comprises: a serializer/deserializer (SerDes); a phase locked loop (PLL); at least one transmitter 405; at least one receiver 407; and at least one OOB signal detector 461.

The elements of a serial ATA PHY according to the present invention are divided into two groups, in which a external PHY chip 40 contains a high-frequency analog circuit portion and a storage medium controller contains a digital circuit portion including a 8B10B encoder for converting a 8-bit serial ATA data signals and control signals into 10-bit signals, a 10B8B decoder for converting the 10-bit signals into 8-bit serial ATA data signals and status signals, and so on. Therefore, the area of a host controller chip will not increase for a high-frequency analog circuit portion is not integrated with the host controller chip. On the other hand, by using such a Circuit, the fabrication yield may be increased and the number of required interface signals for interconnection between the host controller chip and the serial ATA external PHY 40 can be significantly reduced.

In the present embodiment, as shown in FIG. 2, the serializer/deserializer (SerDes) comprises a serializer 423 and a deserializer 443, and the phase locked loop comprises a transmitting phase locked loop 421 and a receiving phase locked loop 441. The transmitting phase locked loop 421 generates clock signals for the serial ATA external PHY 40 and a reference clock (RefClk) to the storage medium controller. The serializer 423 converts parallel data signals from a set of parallel signal transmitting lines (TxData[4:0]) into a serial ATA data signal (TxData) according to a transmitted valid signal (TxValid) and strobe signals (TxStrobe, TxStrobe_) from the storage medium controller. Then the serial ATA data signal (TxData) is transmitted to a peripheral serial ATA device through a set of serial signal transmitting lines (TXP1, TXN1 or TXP2, TXN2) by a transmitter 405.

Moreover, for the receiving part, a receiver 408 receives a serial ATA data signal from a peripheral serial ATA device through a set of serial signal receiving lines (RXP1, RXN1 or RXP2, RXN2) and then transmits the serial ATA data signal to the deserializer 443. The deserializer 443 converts the serial data signal into parallel data signals according to clock signals generated by the receiving phase locked loop 441, and then the deserializer 443 transmits the parallel data signals through a set of parallel signal receiving lines (RxData[4:0]) and strobe signals (RxStrob, RxStrob_) to the storage medium controller. In addition, there is also an OOB (out-of-band) signal detector 461, connected to each serial signal receiving line. The OOB (out-of-band) signal detector 461 reports a squelch signal, an initializing signal (ComInit) and an awakening signal (ComWake) to the storage medium controller.

Furthermore, in the present embodiment, two transmitters and two receivers are included to be connected to a master serial ATA hard disc and a slave serial ATA hard disc, respectively. Therefore, master/slave selectors 425 and 445 are provided so as to receive a control signal (Master) from the storage medium controller to decide whether the master device or the slave device the signal is transmitted to. The master/slave selector 425 is connected to both the transmitters 405 and enables a corresponding transmitter 405 after receiving a transmitted enabling signal (TxEnable1 or TxEnable2) from the serializer 423. The other master/slave selector 445 transmits a serial data signal (RxData1 or RxData2) from a corresponding receiver 407 to the deserializer 443.

In order to minimize the number of interface signals for interconnection between the serial ATA external PHY 40 and the storage medium controller, a selector 403 is provided to choose one of the squelch signals from OOB (out-of-band) signal detector 461 as received quiet signal (SigQuiet) to the storage medium controller according to the control signal (Master). In addition, a multiplexer 409 with one control end and two input ends is also included for testing purpose: one input from master/slave selector 445, the other input from the serializer 423, and the control signal (Loopback) is used to select the output to the deserializer 443 is input from serializer 423 during testing mode. Moreover, according to the present invention, the serial ATA external PHY 40 further comprises a power controller 401, able to receive a PHY reset signal (PhyReset) and multi-level power control signals (PartSlum1 and PartSlum2) from the storage medium controller so as to perform power-saving control. The multi-level power control signals (PartSlum1 and PartSlum2) are input into a level detector 411 and then actual power control signals (Partial1, Slumber1, Partial2 and Slumber2) are generated.

In practical use, a multi-level PHY ready signal (PhyReady) is used to report the ready status of the PHY chip which is composed of a transmitting ready signal (TxReady) and a received locked signal (RxLocked) and generated by a level converter 412 according to a transmitting ready signal (TxReady) from the transmitting phase locked loop 421 and the received locked signal (RxLocked) from the receiving phase locked loop 441.

Figure 3:
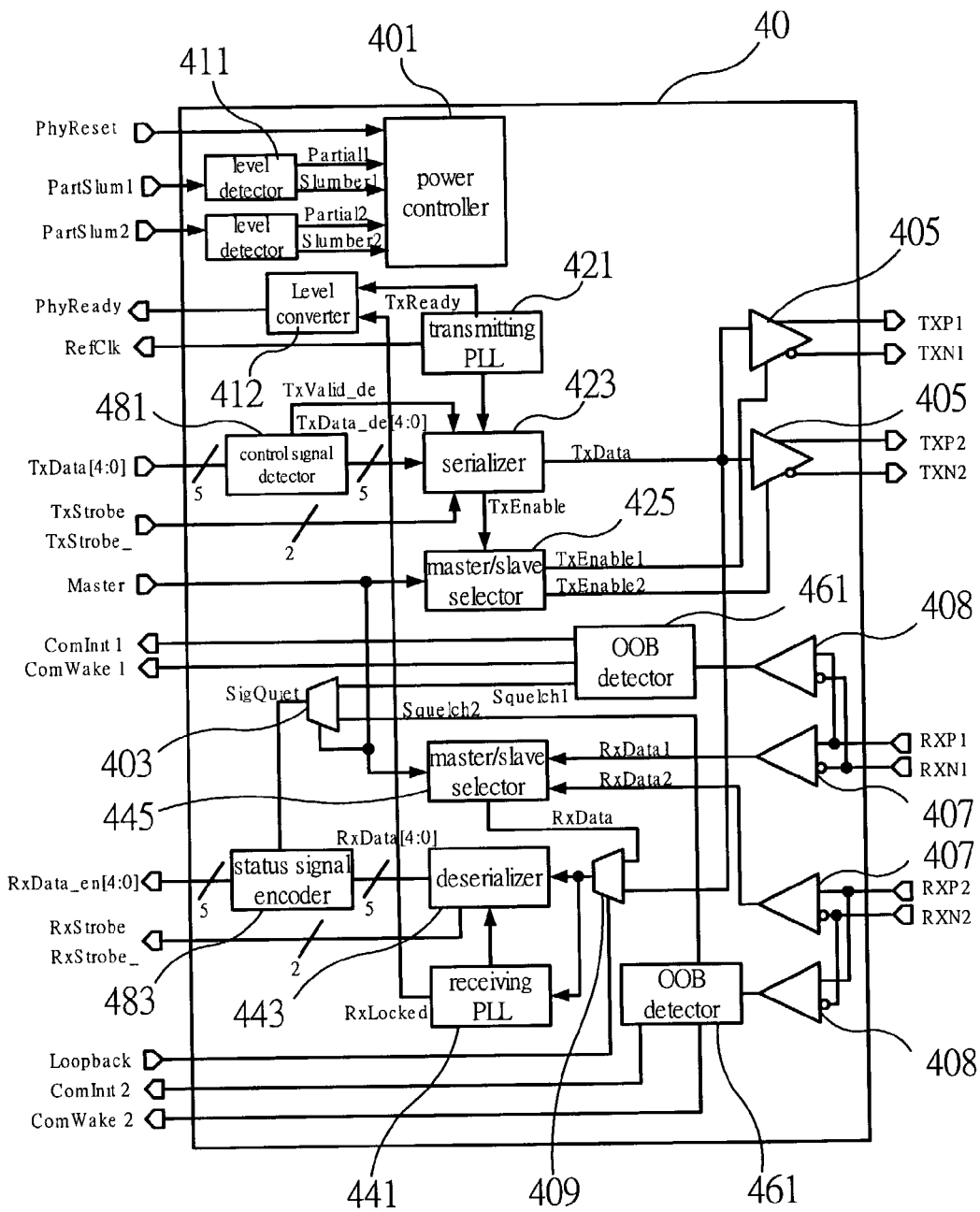
FIG. 3 is a circuit diagram in accordance with another preferred embodiment of the present invention.

Furthermore, please refer to FIG. 3, which is a circuit diagram of a serial ATA external PHY chip in accordance with another preferred embodiment of the present invention. As shown in the figure, the circuit diagram is similar to that in FIG. 2. Additionally, a control signal decoder 481 and a status signal encoder 483 are included. The control signal decoder 481 is designed in the transmitting data path and input data codes from a set of parallel signal transmitting lines (TxData[4:0]) from the storage medium controller which comprising a transmitted valid signal so as to decode the transmitted valid signal (TxValid) form the parallel data signals to the serializer, which may reduce the number of required interface signals. The status signal encoder 483 is designed in the receiving data path so as to encode a received quiet signal (SigQuiet) from the selector 403 and the received parallel data from deserializer 443 to a set of parallel signal codes on said parallel signal receiving lines (RxData[4:0]) to the storage medium controller, which gets rid of one more interface signal.

Moreover, the phase locked loop according to the present invention also provides a function of switching between a plurality of transmission rates. A signal line (not shown) is connected to the storage medium controller so as to receive the control signal from the storage medium controller for performing switching between the transmission rates, which is compatible in different transmission rates of different generations of serial ATA products. In the present invention, the circuit diagram can be integrated as an external PHY chip for convenience in fabrication and lower cost.

Figure 4:
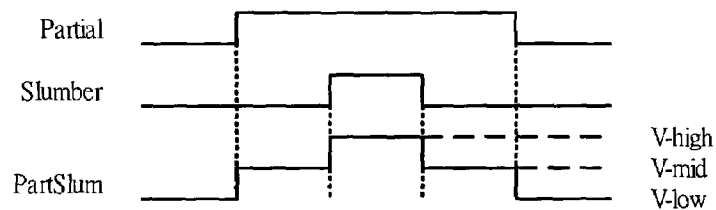
FIG. 4 is a timing diagram of a multi-level power control signal in accordance with the present invention.
Figure 5:
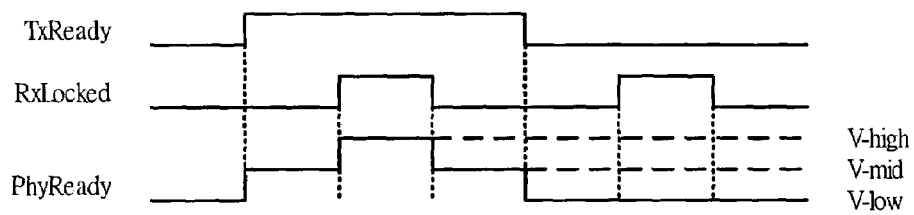
FIG. 5 is a timing diagram of a ready state signal of a PHY (physical layer) in accordance with the present invention.

Please refer to FIG. 4 and FIG. 5, in which FIG. 4 is a timing diagram of a multi-level power control signal and FIG. 5 is a timing diagram of a ready status signal of a PHY in accordance with the present invention. As shown in FIG. 4, the storage medium controller performs multi-level conversion on the power control signal, with a multi-level signal (PartSlum) representing two signals (Partial and Slumber). A low level (V-low) state represents that both signals (Partial and Slumber) are not active. A middle level (V-mid) represents that the Partial signal is active; and a high level (V-high) represents that the Slumber signal is active. The PHY chip is provided with an actual power control signal by level-detection 411.

As shown in FIG. 5, the PHY ready signal (PhyReady) is a multi-level signal formed by superimposing a transmitting ready signal (TxReady) and a received locked signal (RxLocked). In other words, when the transmitting phase locked loop or transmitting buffer is not ready, the PHY ready signal (PhyReady) is at a low level (V-low) state. Only when the transmitting phase locked loop is ready, the PHY ready signal (PhyReady) is at a middle level (V-mid) state. Furthermore, when both the transmitting and the receiving phase locked loop are ready, the PHY ready signal (PhyReady) is at a high level (V-high) state.

Figure 6:
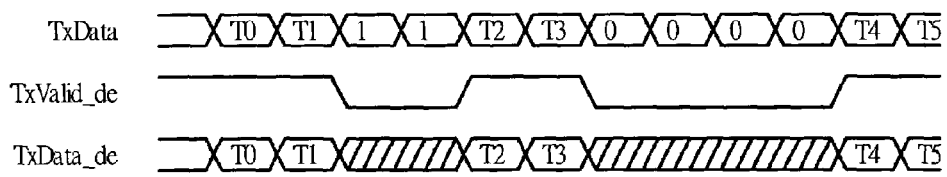
FIG. 6 is a timing diagram showing the decoding of a transmitted valid signal in accordance with the present invention.
Figure 7:
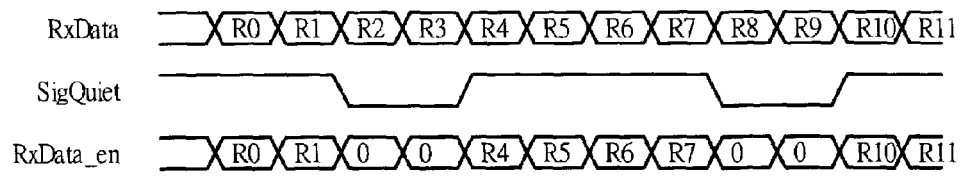
FIG. 7 is a timing diagram showing the encoding of a received quiet signal in accordance with the present invention.

Finally, please refer to FIG. 6 and FIG. 7, in which FIG. 6 is a timing diagram showing the decoding of a transmitted valid signal and FIG. 7 is a timing diagram showing the encoding of a received quiet signal in accordance with the present invention. TxData[4:0] and RxData[4:0] represent a data signal before decoding and before encoding, respectively. TxData_de[4:0] and RxData_en[4:0] represent a data signal after decoding and after encoding, respectively. TxValid_de is a transmitted valid signal after decoding. When a 8-bit data is encoded into a 10-bit code, it will not happen for the ten digits to all become "0" or "1". Therefore, on the storage medium controller side, a control signal encoder will encode such illegal 10-bit data when transmitted valid signal is inactive, whereby the control signal decoder in the PHY chip obtains a transmitted valid signal. For the encoding of a received quiet signal, a status signal encoder in the PHY chip is utilized to encode the received data on the data bus to all become "0" or "1" when received quiet signal is active, whereby the signal decoder in the storage medium controller obtains a received quiet signal.

As described above, the Circuit and the signal encoding method according to the present invention can simplify the circuit design so that the external PHY operates more efficiently and the number of required interface signals is significantly reduced to the number less than 27 for the first- and second-generation ATA specifications (where the Loop-Back signal is only for testing and does not have to be connected to a control module). Therefore, no additional pads are required for the control chip if we want to share the external PHY interface signals with IDE bus. In this regard, the chip cost is significantly reduced. Also, the system designer can determine whether an external PHY chip is to be added after he/she decides to use a serial ATA interfaced system.

According to the previous discussion, it is apparent that the present invention discloses a Circuit and a signal encoding method for reducing the number of serial ATA external PHY interface signals. The Circuit employs a configuration in which digital means and analog means are separated so as to install the high-frequency analog circuit portion into an external PHY chip. The behavior of the PHY interface signals and the characteristic of 10-bit data encoding are also utilized to encode the control signals as well as the status signals into the multi-level interface signals or into a special 10-bit data encoding on the data bus so as to significantly reduce the number of required PHY signals. Therefore, the present invention has been examined to be progressive, advantageous and applicable to the industry.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A physical layer (PHY) circuit device for reducing the numbers of serial advanced technology attachment (ATA) external PHY signals, comprising:
   an external chip for connection to a storage medium controller;
   at least one serializer and at least one deserializer disposed on said external chip for respective connection to the storage medium controller through a set of parallel signal transmitting lines, said serializer being operable to convert a parallel signal from said storage medium controller to a serial signal, said deserializer being operable to convert a serial signal from a serial ATA device to a parallel signal for transmission to said storage medium controller;

transmitting and receiving phase locked loops disposed with said serializer and deserializer on said external chip, said transmitting and receiving phase locked loops being connected respectively to said serializer and deserializer for selectively generating clock signals required for data signal transmission, at least one of said transmitting and receiving phase locked loops being operable to generate a reference clock signal output to said storage medium controller;

at least one transmitter disposed on said external chip connected to said serializer for transmitting the serial signal generated thereby through a set of serial signal transmitting lines to the serial ATA device;

at least one receiver disposed on said external chip connected to said deserializer for transmitting the serial signal received from the serial ATA device through a set of serial signal receiving lines to said deserializer;

at least one out of band (OOB) signal detector disposed on said external chip connected to at least one of said signal receiving lines, said OOB signal detector being operable to detect for said storage medium controller out of band signals received from the serial ATA device;

a power controller disposed on said external chip for controlling a power state of said external chip responsive to receipt of multi-level power control signals from said storage medium controller;

a pair of level detectors each having a pair of outputs coupled to said power controller, each of said level detectors having an input for receiving a respective one of said multi-level power control signals, each of said multi-level power control signals being encoded to have three signal states defined by a first voltage level representing neither of two control signals being active, a second voltage level representing one of said two control signals being active, and a third voltage level representing the other of said two control signals being active, said second voltage level being intermediate said first and third voltage levels, each of said voltage level detectors decoding said respective multi-level power control signal into said two control signals respectively provided at said pair of outputs; and, at least one master/slave selector disposed on said external chip connected to at least one of said transmitter and receiver for the selective coupling thereof to master and slave devices outside said external chip.

2. The PHY external circuit device as recited in claim 1, further comprising a leve converter for output of a multi-level PHY ready status signal encoded from input of a transmitting ready signal output from said transmitting phase locked loop and a received locked signal output from said receiving phase locked loop, said encoded multi-level PHY ready status signal having three signal states defined by a first voltage level representing neither of said transmitting ready signal and said received locked signal being active, a second voltage level representing said transmitting ready signal being active, and a third voltage level representing said received locked signal being active, said second voltage level being intermediate said first and third voltage levels.

3. The PHY external circuit device as recited in claim 1 further comprising a control signal decoder connected to said parallel signal transmitting lines, said control signal decoder being operable to decode at least a transmitted valid signal far transmit to said serializer.

4. The PHY external circuit device as recited in claim 1 further comprising a status signal encoder connected to said deserializer, said status signal encoder being operable to encode at least a received squelch signal from said OOB signal detector for transmit through said parallel signal receiving lines to said storage medium controller.

5. The PHY external circuit device as recited in claim 4 further comprising a selector connected to a plurality of OOB signal detectors, said selector being operable to select said received squelch signal from one of said plurality of OOB signal detectors for passage to said status signal encoder responsive to a control signal from said storage medium controller.

6. The PHY external circuit device as recited in claim 1, wherein said master/slave selector selectively sets a transmission path for said data signals responsive to a control signal from said storage medium controller.

7. The PHY external circuit device as recited in claim 1 comprising a plurality of said master/slave selectors comprises a transmitting master/slave selector connected to said transmitter and a receiving master/slave selector connected to said receiver.

8. The PHY external circuit device as recited in claim 1 further comprising a selector connected to said OOB signal detector, said selector being operable to select a received quiet signal from said OOB signal detector for passage to said storage medium controller responsive to a control signal from said storage medium controller.

9. The PHY external circuit device as recited in claim 1, wherein said transmitting phase locked loop further is operable to switch between a plurality of transmission rates responsive to a transmission rate selecting signal from said storage medium controller.

10. The PHY external circuit device as recited in claim 1, wherein said transmitting phase locked loop is operable to switch between a plurality of transmission rates responsive to a control signal received from said storage medium controller through a signal line.

11. A physical layer (PHY) circuit device for reducing the numbers of serial advanced technology attachment (ATA) external PHY signals, comprising:

an external chip for connection to a storage medium controller;

at least one serializer and at least one deserializer disposed on said external chip for respective connection to the storage medium controller through a set of parallel signal transmitting lines, said serializer being operable to convert a parallel signal from said storage medium controller to a serial signal, said deserializer being operable to convert a serial signal from a serial ATA device to a parallel signal for transmission to said storage medium controller;

transmitting and receiving phase locked loops disposed with said serializer and deserializer on said external chip, said transmitting and receiving phase locked loops being connected respectively to said serializer and deserializer for selectively generating clock signals required for data signal transmission, at least one of said transmitting and receiving phase locked loops being operable to generate a reference clock signal output to said storage medium controller;

at least one transmitter disposed on said external chip connected to said serializer for transmitting the serial signal generated thereby through a set of serial signal transmitting lines to the serial ATA device;

at least one receiver disposed on said external chip connected to said deserializer for transmitting the serial signal received from the serial ATA device through a set of serial signal receiving lines to said deserializer;

at least one out of band (OOB) signal detector disposed on said external chip connected to at least one of said signal receiving lines, said OOB signal detector being operable to detect for said storage medium controller out of band signals received from the serial ATA device;

a power controller disposed on said external chip for controlling a power state of said external chip responsive to receipt of multi-level power control signals from said storage medium controller;

a pair of level detectors each having a pair of outputs coupled to said power controller, each of said level detectors having an input for receiving a respective one of said multi-level power control signals, each of said multi-level power control signals being encoded to have three signal states defined by a first voltage level representing neither of two control signals being active, a second voltage level representing one of said two control signals being active, and a third voltage level representing the other of said two control signals being active, said second voltage level being intermediate said first and third voltage levels, each of said voltage level detectors decoding said respective multi-level power control signal into said two control signals respectively provided at said pair of outputs; and, a control signal decoder disposed on said external chip connected to said parallel signal transmitting lines, said control signal decoder being operable to decode at least a transmitted valid signal for transmit to said serializer.

12. The PHY external circuit device as recited in claim 11 further comprising a status signal encoder connected to said deserializer, said status signal encoder being operable to encode at least a received quiet signal from said OOB signal detector for transmit through said parallel signal receiving lines to said storage medium controller.

13. A method for reducing the numbers of serial advanced technology attachment (ATA) external PHY signals of a physical layer (PHY) circuit device, comprising the steps of:

establishing an external chip for connection to a storage medium controller, forming on said external chip at least one serializer and at least one deserializer for respective connection to the storage medium controller through a set of parallel signal transmitting lines, said serializer being operable to convert a parallel signal from said storage medium controller to a serial signal, said deserializer being operable to convert a serial signal from a serial ATA device to a parallel signal for transmission to said storage medium controller;

forming with said serializer and deserializer on said external chip a transmitting and receiving phase locked loops, said transmitting and receiving phase locked loops being connected respectively to said serializer and deserializer for selectively generating clock signals required for data signal transmission, at least one of said transmitting and receiving phase locked loops being operable to generate a reference clock signal output to said storage medium controller;

forming on said external chip at least one transmitter connected to said serializer for transmitting the serial signal generated thereby through a set of serial signal transmitting lines to the serial ATA device;

forming on said external chip at least one receiver connected to said deserializer for transmitting the serial signal received from the serial ATA device through a set of serial signal receiving lines to said deserializer;

forming on said external chip at least one out of band (OOB) signal detector connected to at least one of said signal receiving lines, said OOB signal detector being operable to detect for said storage medium controller out of band signals received from the serial ATA device;

forming on said external chip a control signal decoder connected to said parallel signal transmitting lines, said control signal decoder being operable to decode at least a transmitted valid signal for transmit to said serializer;

forming on said external chip a status signal encoder connected to said deserializer, said status signal encoder being operable to encode at least a received quiet signal from said OOB signal detector for transmit through said parallel signal receiving lines to said storage medium controller; and, forming a level converter on said external chip and encoding a transmitting ready signal output from said transmitting phase locked loop and a received locked signal output from said receiving phase locked loop to form a multi-level PHY ready status signal, said encoded multi-level PHY ready status signal having three signal states defined by a first voltage level representing neither of said transmitting ready signal and said received locked signal being active, a second voltage level representing said transmitting ready signal being active, and a third voltage level representing said received locked signal being active, said second voltage level being intermediate said first and third voltage levels.

14. The method as recited in claim 13, wherein data signals in an interval where a transmitted valid signal is inactive are commonly set to all "1" states or all "0" states if said data signals are transmitted from said storage medium controller to said external chip.

15. The method as recited in claim 13, wherein data signals in an interval where a received quiet signal is active are commonly set to all "1" states or all "0" states if said data signals are transmitted from said external chip to said storage medium controller.

* * * * *